Feb. 6, 1923. 1,444,037
D. G. ROOS.
DISTANCE AND BRAKE REACTION ROD CONSTRUCTION FOR MOTOR VEHICLES.
FILED APR. 19, 1920. 3 SHEETS-SHEET 1
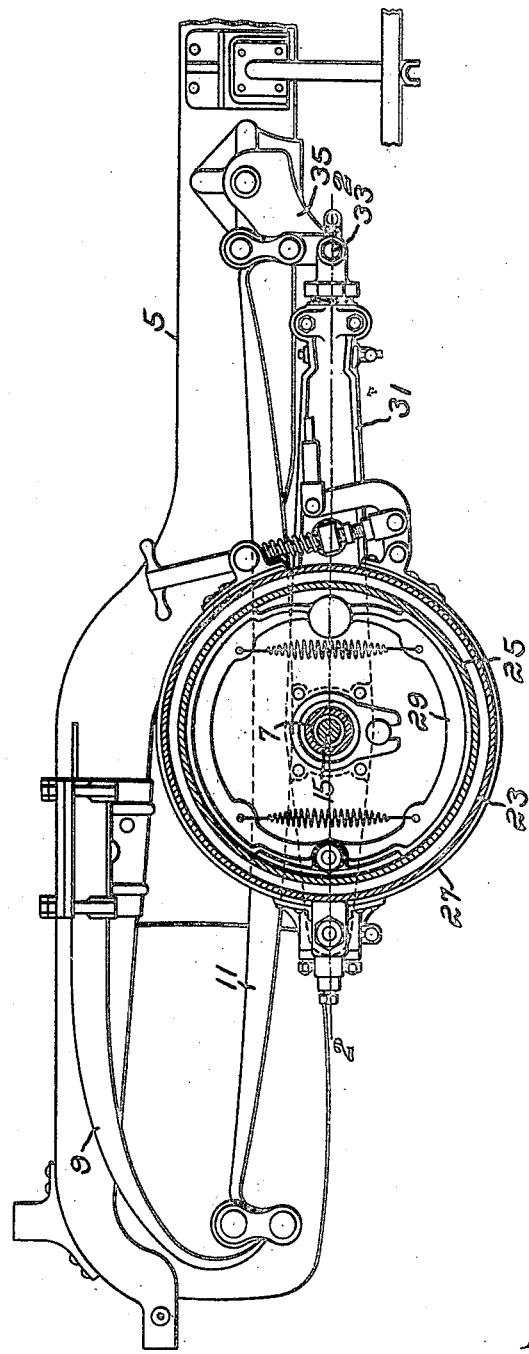

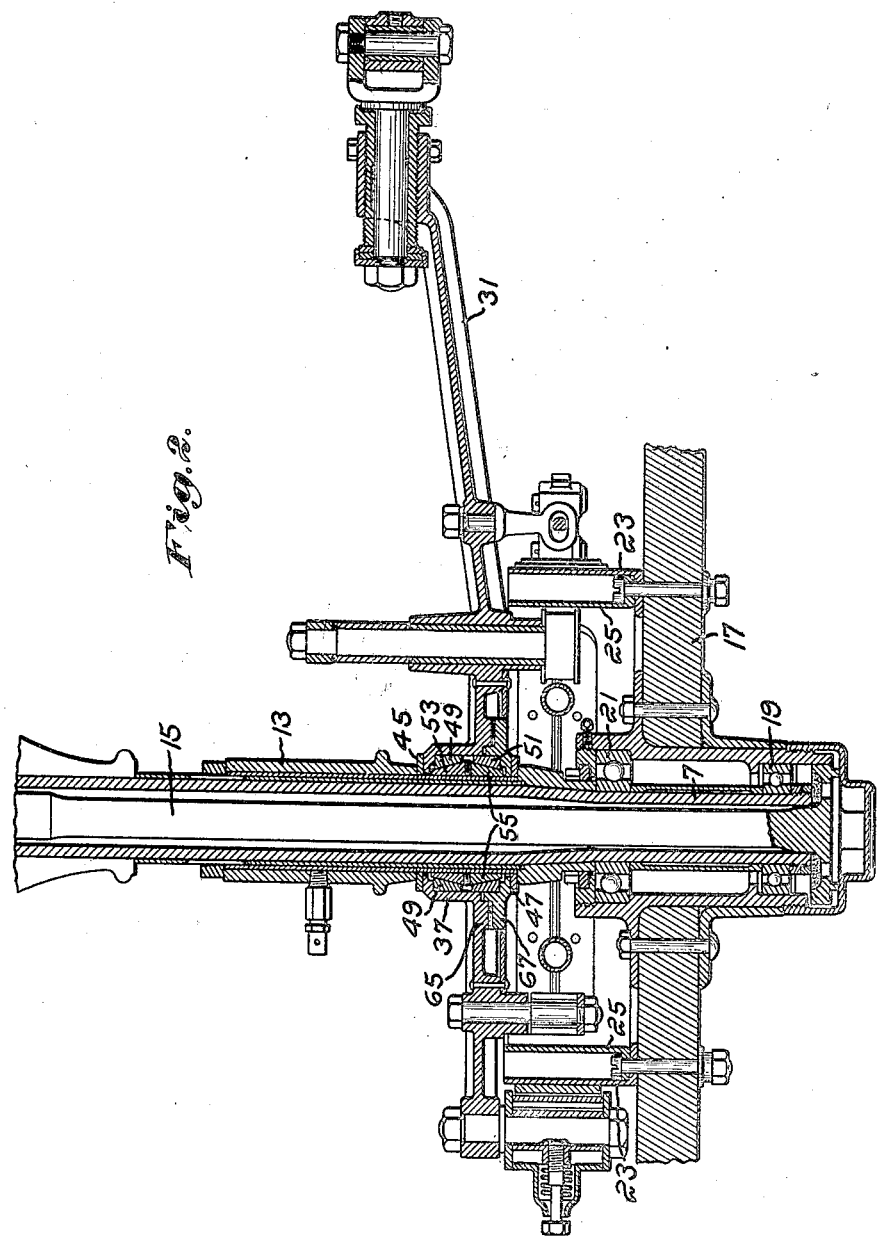

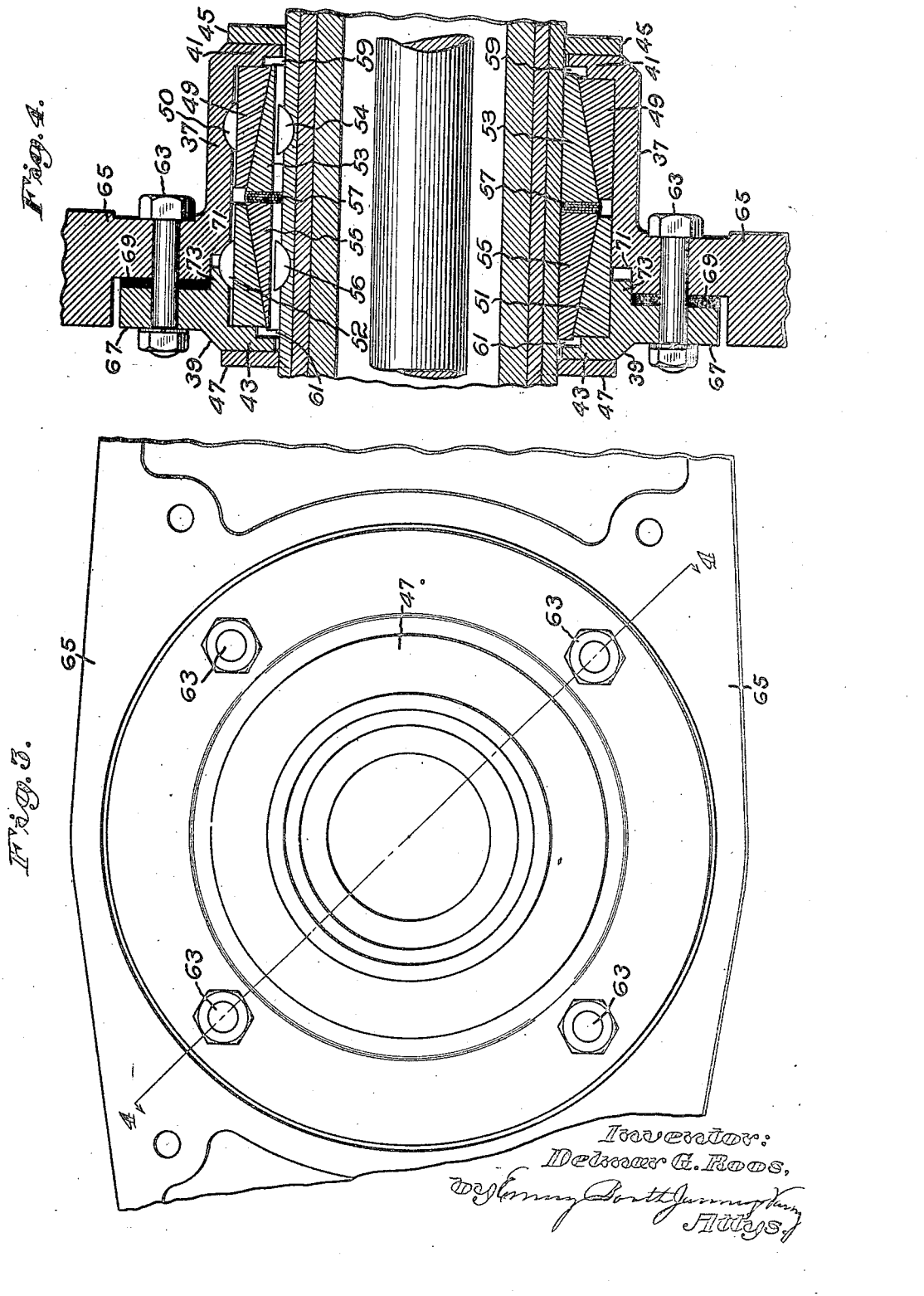

Patented Feb. 6, 1923.

1,444,037

UNITED STATES PATENT OFFICE.

DELMAR G. ROOS, OF BRIDGEPORT, CONNECTICUT, ASSIGNOR TO THE LOCOMOBILE COMPANY, OF BRIDGEPORT, CONNECTICUT, A CORPORATION OF DELAWARE.

DISTANCE AND BRAKE REACTION ROD CONSTRUCTION FOR MOTOR VEHICLES.

Application filed April 19, 1920. Serial No. 374,893.

*To all whom it may concern:*

Be it known that I, DELMAR G. ROOS, a citizen of the United States, and a resident of Bridgeport, in the county of Fairfield and State of Connecticut, have invented an Improvement in Distance and Brake Reaction Rod Constructions for Motor Vehicles, of which the following description, in connection with the accompanying drawings, is a specification, like characters on the drawings representing like parts.

This invention relates to motor vehicles, and is more especially concerned with the distance or radius rods commonly employed to prevent forward or backward displacement of the rear axle with relation to the main frame. These distance rods sometimes support the brakes, and thus receive the brake reaction stresses. These rods oscillate about the axle, and the consequent wear at this point eventually results in looseness and annoying rattling of the connections between the rods and the axle. My invention aims to provide simple, strong and effective means of adjustment to compensate for this wear, whereby to avoid the rattling which commonly occurs.

My invention will be best understood by reference to the following description, when taken in connection with the accompanying drawings of a portion of a motor vehicle exemplifying my invention, while its scope will be more particularly pointed out in the appended claims.

In the drawings:

Fig. 1 is a side elevation partly in vertical section of the rear end of a motor vehicle exemplifying my invention;

Fig. 2 is a sectional view on an enlarged scale on line 2—2 of Fig. 1;

Fig. 3 is a side elevation on an enlarged scale of that portion of the distance rod which encircles the axle; and Fig. 4 is a sectional view on line 4—4 of Fig. 3.

Referring to the drawings, and to the embodiment of my invention which I have selected for exemplification, I have there shown a portion of a motor vehicle comprising a usual frame 5 (see Fig. 1), supported in a known manner on the rear axle 7 by springs 9 and 11. It should be understood of course that duplicate springs are employed on opposite sides, respectively, of the frame, and that the brakes and distance and brake reaction rods are also in duplicate, but it is deemed unnecessary herein to show or describe but one set. The springs are supported on the axle through the medium of usual spring seats 13 (see Fig. 2), in which the axle oscillates, it being understood, of course, that in this type of construction, it is customary to employ a torque arm (not herein shown) to take the torque reaction stresses set up by the transmission of power through shafts 15 to wheels 17, the latter being herein mounted to turn on annular bearings 19 and 21 on the tubular axle 7.

Secured to the wheels are suitable brake drums, herein two distinct drums 23 and 25, one for an external band-brake 27, and the other for an internal expanding brake 29. In the present example, both sets of brakes and their operating mechanisms are mounted in a known manner on a distance and brake reaction rod 31, whose forward end is pivoted at 33 on a bracket 35 constituting a part of the main frame 5. The details of construction and mode of operation of the brakes are too well known to require further description. Relative up and down motion between the frame and axle is accompanied by swinging motion of the rods 31 about their pivots 33 and about the axle 7, and the rods maintain a fixed distance between said axle and pivots in the usual manner.

I will now describe the construction of the novel connection between the distance rods, and the axle, whereby any play which develops at this point because of wear may be compensated for by making an appropriate adjustment. Referring now to Figs. 3 and 4, each distance rod is provided with a sleeve encircling the axle, and in the present example, this sleeve is composed of two parts, a body 37 and a cap 39, provided, respectively, with opposed abutments 41 and 43. Herein, hardened steel collars 45 and 47 prevent undue wear on the end surfaces of these abutments. The sleeve is chambered to provide a space for a pair of internally and oppositely tapered collars 49 and 51, and a pair of externally and oppositely tapered collars 53 and 55, one pair being mounted to turn on the other. The collars 49 and 51 may be suitably held against turning movement with respect to the surrounding sleeve, as by keys 50 and 52, and the collars 53 and 55 may be held against turning movement with relation to the axle, as by keys 54 and 56. In practice, the collars 49 and 51 are preferably made of bronze, while the collars 53 and 55 are made of hardened steel. The outer collars 49 and 51 abut against the abutments 41 and 43, respectively, while the collars 53 and 55 abut against each other, or against one or more, herein a plurality of shims 57 interposed therebetween. The inner ends of the collars 49 and 51 should at all times be spaced apart, and if, at any time, through long continued wear of the bearing surfaces, said collars approach and finally meet each other, one or more shims 57 may be inserted between the adjacent ends of the inner collars 53 and 55. When the vehicle is new, it is unnecessary to provide these shims, and they become necessary only after many thousands of miles of use. Suitable clearance spaces 59 and 61 are provided between the outer ends of the collars 53 and 55 and the abutments 43.

Adjustment for wear between the bearing surfaces of the inner and outer pairs of tapered collars is accomplished by adjusting the outer collars toward each other, and this may be effected by any suitable means, such as a set of bolts 63 extending through a web 65 on the body 37 of the distance rod, and through a circumferential flange 67 on the cap 37. These bolts are rendered accessible by simply removing the wheel 17 and reaching through the internal expanding brakes 29. Inward movement of the cap 39 under the influence of the adjusting bolts 63 may be limited by suitable means, such as one or more, herein a plurality of shims 69 in the form of rings interposed between the adjacent faces of the web 65 and the flange 67. By this means, the outer collars 49 and 51 are prevented from binding on the inner collars 53 and 55. As wear takes place, one or more of the shims 69 may be removed, and the parts reassembled, the bolts 63 clamping them together, and maintaining the adjustment. Preferably, the body 37 and cap 39 are provided with means to guide one on the other, and to hold them in axial alignment, such means herein comprising an internal bore 71 formed in the body 37, and presenting an internal cylindrical surface forming a guide for the outer cylindrical surface of a boss 73 formed on a cap 39. The depth of the bore 71 should be sufficient to allow for the maximum adjustment of the cap 39 toward the body 37.

Having thus described one embodiment of my invention, but without limiting myself thereto, what I claim and desire to secure by Letters Patent is:

1. In a motor vehicle, the combination of a frame, an axle, a distance rod pivotally connected to said frame and having a sleeve encircling said axle and arranged to turn about the latter, and means including a tapered collar interposed between said axle and said sleeve to take up play in the connection between said axle and said sleeve.

2. In a motor vehicle, the combination of a frame, an axle, a distance rod pivotally connected to said frame and having a sleeve encircling said axle and arranged to turn about the latter, and means including a pair of oppositely tapered collars interposed between said axle and said sleeve, to take up play in the connection between said axle and said sleeve.

3. In a motor vehicle, the combination of a frame, an axle, a distance rod pivotally connected to said frame and having a sleeve encircling said axle and arranged to turn about the latter, and means including two pairs of oppositely tapered collars interposed between said axle and said sleeve, to take up play in the connection between said axle and said sleeve.

4. In a motor vehicle, the combination of a frame, an axle, a distance rod pivotally connected to said frame and having a sleeve encircling said axle and arranged to turn about the latter, said sleeve comprising two parts provided with opposed abutments, a pair of internally and oppositely tapered collars interposed between and abutting against said abutments within said sleeve, a pair of externally and oppositely tapered collars abutting end to end within the first-mentioned collars, and means for relatively adjusting said sleeve parts toward each other.

5. In a motor vehicle, the combination of a frame, an axle, a distance rod pivotally connected to said frame and having a sleeve encircling said axle and arranged to turn about the latter, said sleeve comprising two parts provided with opposed abutments, a pair of internally and oppositely tapered collars interposed between and abutting against said abutments within said sleeve, a pair of externally and oppositely tapered collars abutting end to end within the first-mentioned collars, means for relatively adjusting said sleeve parts toward each other and means to limit the movement of said sleeve parts toward each other.

6. In a motor vehicle, the combination of a frame, an axle, a distance rod pivotally connected to said frame and having a sleeve encircling said axle and arranged to turn about the latter, said sleeve comprising two parts provided with opposed abutments, a pair of internally and oppositely tapered collars interposed between and abutting against said abutments, within said sleeve, a pair of externally and oppositely tapered collars abutting end to end within the first-mentioned collars, means for relatively adjusting said sleeve parts toward each other and means adjustably to limit the movement of said sleeve parts toward each other.

7. In a motor vehicle, the combination of a frame, an axle, a distance rod pivotally connected to said frame and having a sleeve encircling said axle and arranged to turn about the latter, said sleeve comprising two parts provided with opposed abutments, a pair of internally and oppositely tapered collars, interposed between and abutting against said abutments within said sleeve, a pair of externally and oppositely tapered collars abutting end to end within the first-mentioned collars, means for relatively adjusting said sleeve parts toward each other, and a plurality of shims to limit the movement of said sleeve parts toward each other.

In testimony whereof, I have signed my name to this specification.

DELMAR G. ROOS.